US010736473B2

United States Patent
Rife

(10) Patent No.: US 10,736,473 B2
(45) Date of Patent: *Aug. 11, 2020

(54) TOILET

(71) Applicant: Robert Rife, Mt. Pleasant, SC (US)

(72) Inventor: Robert Rife, Mt. Pleasant, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/184,230

(22) Filed: Nov. 8, 2018

(65) Prior Publication Data
US 2019/0069733 A1 Mar. 7, 2019

Related U.S. Application Data

(63) Continuation-in-part of application No. 15/423,248, filed on Feb. 2, 2017, now Pat. No. 10,188,245, which is a continuation-in-part of application No. 15/014,192, filed on Feb. 3, 2016, now Pat. No. 9,770,144.

(60) Provisional application No. 62/209,938, filed on Aug. 26, 2015.

(51) Int. Cl.
A47K 11/00 (2006.01)
G01G 19/52 (2006.01)
A47K 11/04 (2006.01)

(52) U.S. Cl.
CPC .............. A47K 11/00 (2013.01); A47K 11/04 (2013.01); G01G 19/52 (2013.01)

(58) Field of Classification Search
CPC ......... A47K 11/00; A47K 13/10; G01G 19/52
USPC ........................................................... 4/664
See application file for complete search history.

(56) References Cited

U.S. PATENT DOCUMENTS

| 4,510,631 A | 4/1985 | Grady |
| 4,587,678 A | 5/1986 | Love et al. |
| 4,795,176 A | 1/1989 | Harrigan et al. |
| 5,279,000 A | 1/1994 | Mercier et al. |
| 5,309,583 A | 5/1994 | White et al. |
| 5,383,709 A | 1/1995 | Chaney et al. |
| 5,570,865 A | 11/1996 | Godfrey |

(Continued)

FOREIGN PATENT DOCUMENTS

| JP | 11169406 | 6/1999 |
| WO | WO2014112815 | 7/2014 |

OTHER PUBLICATIONS

Brochure: LiftSeat Powered Toilet Lifts: The LS600 Bariatric Toilet Left, 2006-2012.

(Continued)

Primary Examiner — Huyen D Le
(74) Attorney, Agent, or Firm — B. Craig Killough; Barnwell Whaley Patterson & Helms

(57) ABSTRACT

A toilet inhibits an occupant from exiting the toilet. Load sensors positioned in communication with the toilet seat detect a change of a load or pressure on the toilet by an occupant that is consistent with an occupant attempting to exit the toilet, and/or movements of an occupant that are consistent with an occupant attempting to exit the toilet. Other sensors may monitor movements that are consistent with an occupant attempting to exit the toilet. The sensors cause an actuator to change the angle of the toilet seat, which inhibits exiting the toilet. The toilet may also be constructed to signal an attendant when actions by an occupant are consistent with actions indicating an attempt by the occupant to exit the toilet.

18 Claims, 14 Drawing Sheets

(56) References Cited

U.S. PATENT DOCUMENTS

| | | | |
|---|---|---|---|
| 5,945,914 A | 8/1999 | Holmes et al. | |
| 6,189,164 B1 * | 2/2001 | Krapu | A61G 5/14 297/313 |
| 6,308,347 B1 | 10/2001 | King | |
| 6,398,305 B1 | 6/2002 | Ball et al. | |
| 6,754,917 B1 * | 6/2004 | Rhoades | A61G 7/1007 4/667 |
| 7,039,964 B2 * | 5/2006 | Cavanagh | A61G 7/1007 4/246.1 |
| 8,056,158 B2 * | 11/2011 | Henshaw | A61G 7/1007 297/DIG. 10 |
| 8,866,620 B2 | 10/2014 | Amir | |
| 9,770,114 B2 * | 9/2017 | Brosnan | A47C 27/082 |
| 9,770,144 B2 | 9/2017 | Rife | |
| 10,188,245 B2 * | 1/2019 | Rife | A47K 13/10 |
| 2006/0042005 A1 | 3/2006 | Johnson et al. | |
| 2006/0087097 A1 | 4/2006 | Kramer et al. | |
| 2009/0144891 A1 | 6/2009 | Peng | |
| 2010/0219668 A1 | 9/2010 | Nelson | |
| 2013/0082842 A1 | 4/2013 | Balazs et al. | |

OTHER PUBLICATIONS

Wireless Telemetry System (WTS) for Loan Cells and Torque Transducers, http://www.interfaceforce.com/index.php?mod=product&show=161&utm_source=bind, 2015.

What is a Load Cell? How do Load Cells Work?, http://www.loadstarsensors.com/what-is-a-load-cell.htm, 2015.

\* cited by examiner

TOILET

This application is a Continuation in Part application of Ser. No. 15/423,248 filed Feb. 2, 2017 which is a Continuation in Part of application Ser. No. 15/014,192 filed Feb. 3, 2016, now U.S. Pat. No. 9,770,144, which claimed the benefit of Provisional Application Ser. No. 62/209,938 filed Aug. 26, 2015.

FIELD OF THE INVENTION

This invention relates to toilets generally and is more specifically directed to a toilet that discourages users from exiting the toilet without assistance.

BACKGROUND OF THE INVENTION

Healthcare facilities, including nursing homes and hospitals, are increasingly aware of fall risks and the patients and residents who are more likely to fall while residing at a healthcare facility. One situation in which falls occur is when a person exits a toilet.

A person using a toilet in a healthcare facility or nursing home, and who is a fall risk, is given privacy while using the toilet. The person is instructed to request assistance before attempting to exit the toilet. However, people are frequently embarrassed to ask for assistance, and attempt to exit the toilet without assistance. Such persons may be at risk of falling due to age, medical condition, or medications, as they transition from a seated to a standing position.

There is a need for a device that will inhibit a person who is at risk of falling from attempting to stand or attempting to exit a toilet without assistance.

SUMMARY OF THE INVENTION

The present invention is a toilet that inhibits an occupant from exiting the toilet. Load sensors positioned in communication with the toilet seat detect a change in the application of load or pressure on the toilet seat by an occupant that is consistent with an occupant attempting to exit the toilet, and/or movements of the occupant that are consistent with an occupant attempting to exit the toilet. Other sensors may monitor an opening to the toilet through which an occupant exits. Upon stimulus, the sensors cause an actuator to change the angle of the toilet seat, which inhibits exiting the toilet. The toilet may also be constructed to signal an attendant when actions by an occupant are consistent with actions indicating an attempt by the occupant to exit the toilet. Actuators may be employed to assist exiting the toilet.

BRIEF DRAWING DESCRIPTION

Figure 7:
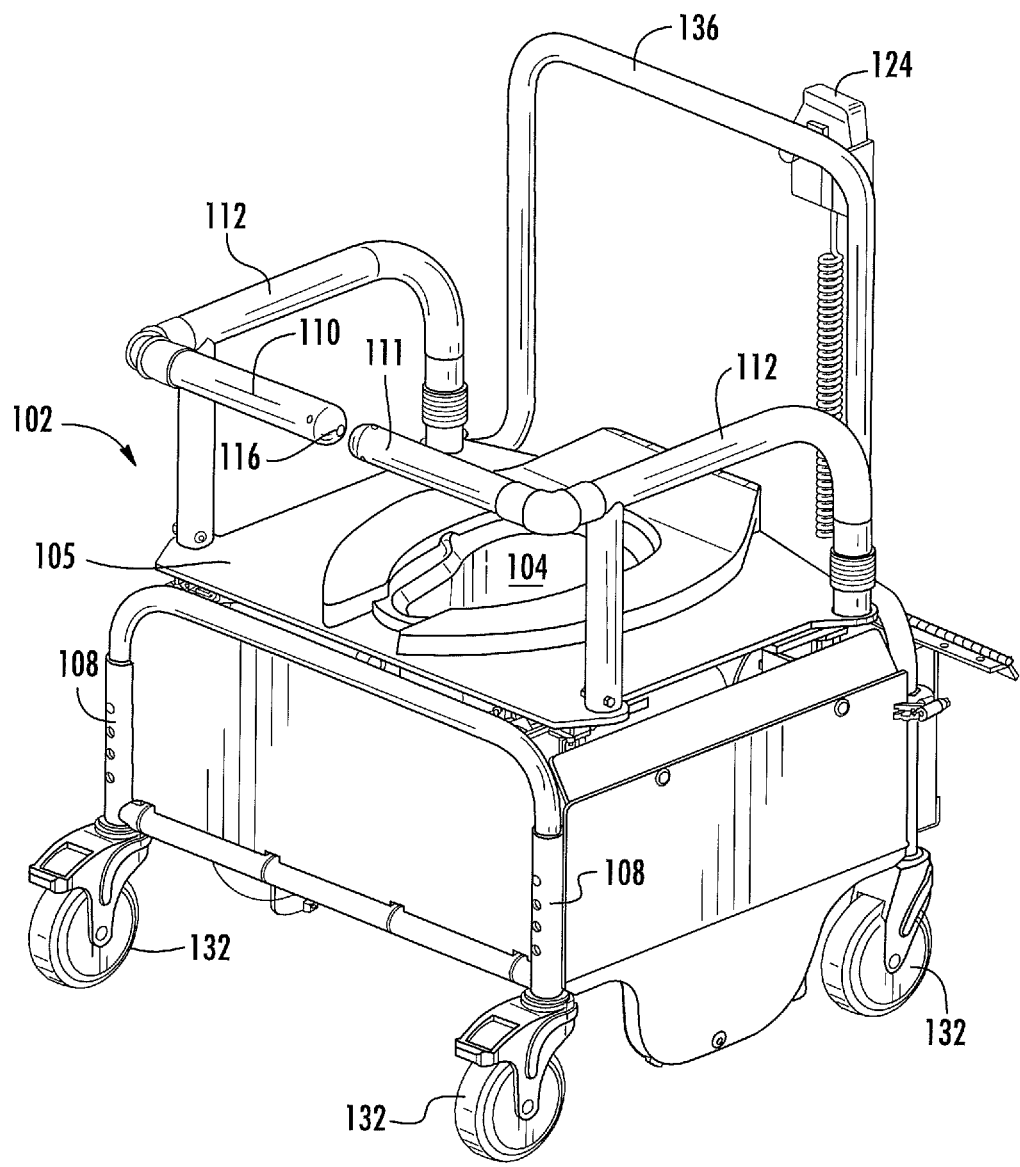
FIG. 7 is a front perspective view of another embodiment of the toilet of the invention.
Figure 13:
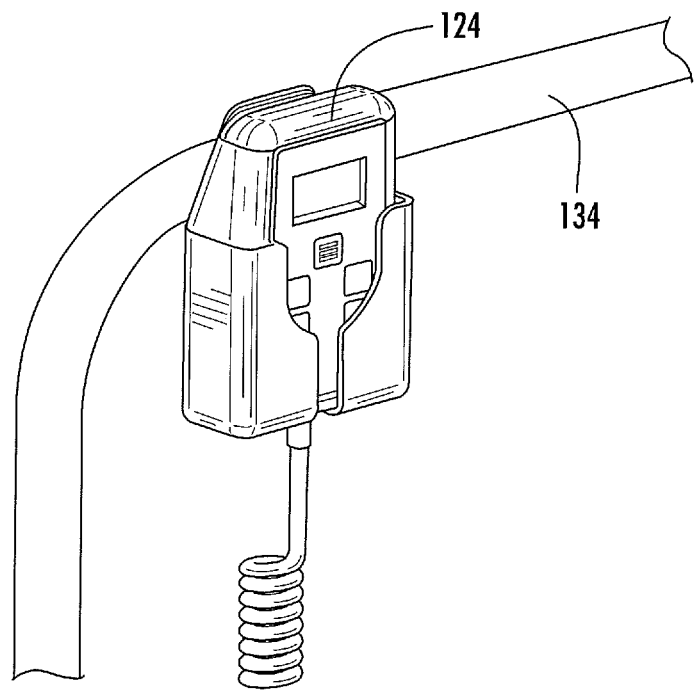

FIG. 13 demonstrates a controller that is useful with the embodiment of the toilet shown in FIG. 7.

Figure 14:
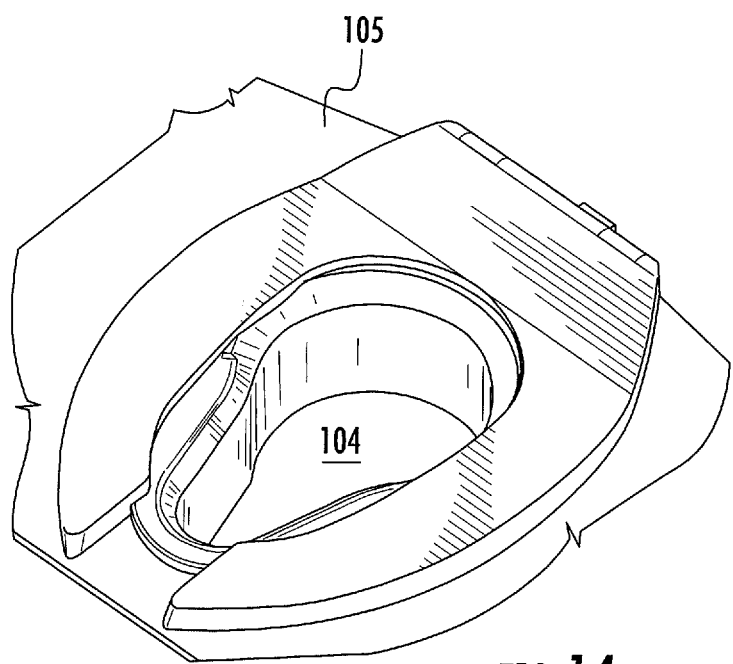

FIG. 14 is an isolation of a toilet seat construct for the embodiment of the toilet shown in FIG. 7.

Figure 15:
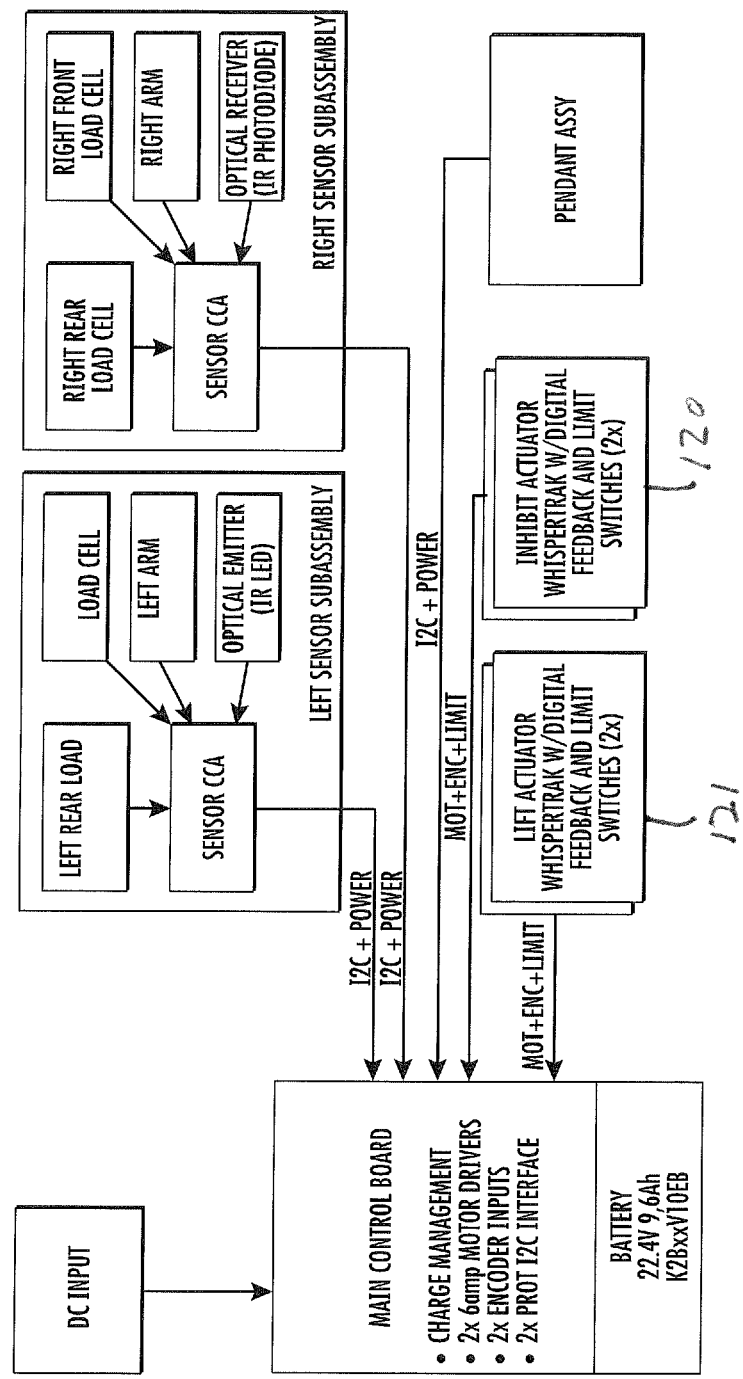

FIG. 15 is an exemplary schematic for the embodiment of the toilet shown in FIG. 7.

Figure 16:
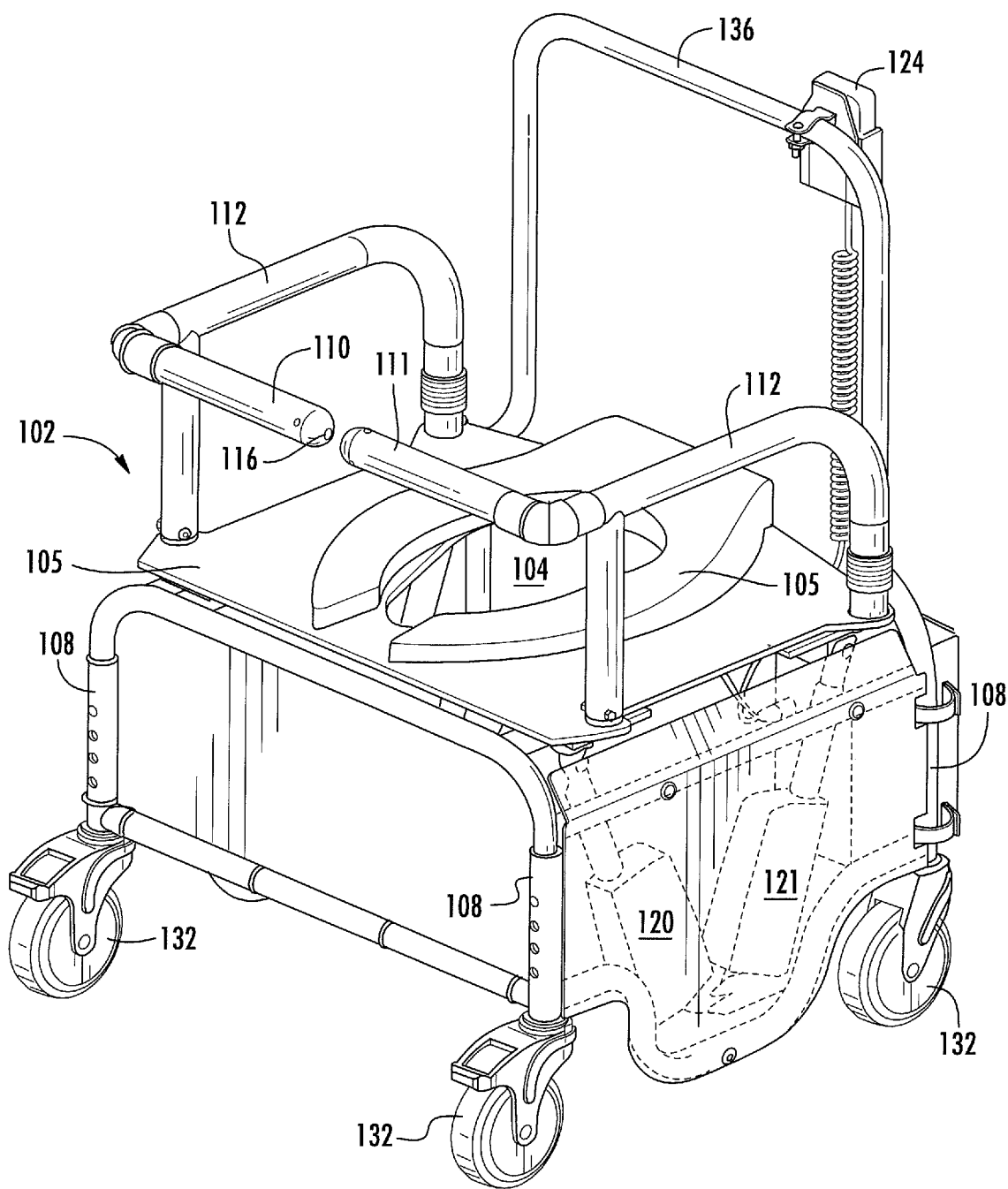

FIG. 16 is a perspective view of the toilet of FIG. 7.

DESCRIPTION OF PREFERRED EMBODIMENTS

The present invention is a toilet comprising one or more sensors that sense movements of an occupant that are indicative of a person attempting to exit a toilet. The sensors emit a signal that actuates changes in an angle of the seat of the toilet.

Upon actuation of one or more of the sensors, an angle of the seat of the toilet changes from generally horizontal to an angle that is not horizontal. In one embodiment, a top surface of the toilet changes from generally horizontal to an angle that is preferably not more than thirty degrees and more preferably not more than twenty two and a half (22½°) degrees from horizontal, with the front of the toilet seat, or portion of the toilet seat closer to the front of the toilet seat, elevated relative to the rear of the toilet seat, that is, the seat is moved to incline from a rear portion of the seat to a front portion of the seat. The change in angle increases the effort required to exit the toilet, and inhibits a user from exiting from the toilet, particularly where the user is of advanced age, or has limited strength or mobility, due to medical conditions or medications.

Figure 1:
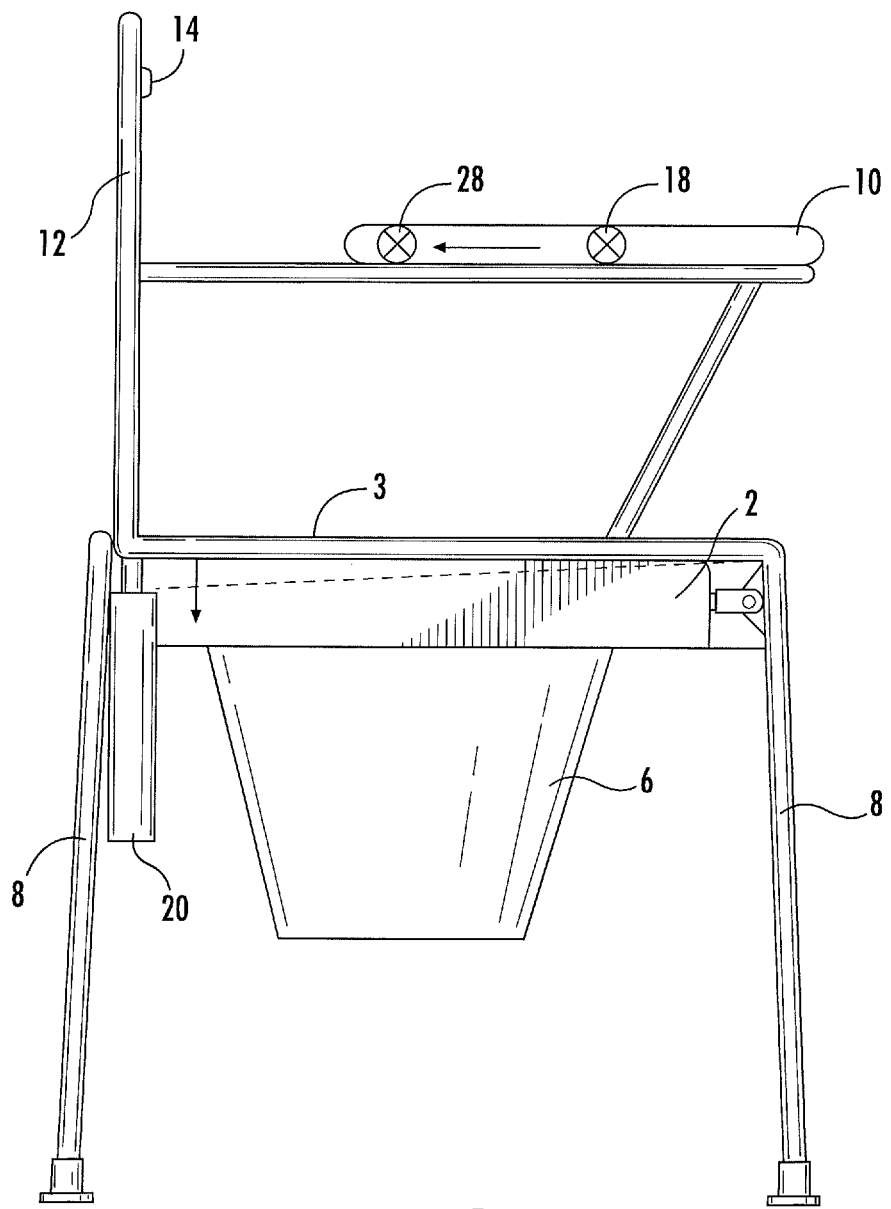
FIG. 1 is a side elevation of an embodiment of a toilet according to the invention.

In the embodiment shown in FIG. 1, the actuator is positioned in the rear of the toilet, and the seat is moved to the inclined position by moving the rear of the seat downwardly. In the embodiment shown in FIG. 5 and FIG. 6, the actuator is positioned in the front of the device. The actuator moves the front of the seat upwardly so that the inclined position of the seat is accomplished by moving the front of the seat upwardly relative to the rear of the seat In the embodiment shown in FIG. 1 or FIG. 5, a toilet similar to a portable toilet used in medical facilities and nursing homes is depicted. The toilet 2 has a seat 3, with an opening 4 in the seat that communicates with a receptacle for waste material. The seat is elevated to an appropriate height by a plurality of legs 8, such as four legs. Arms, such as the pair of arms 10, are spaced apart and are present on opposite sides of the toilet seat. The arms may extend upwardly from the toilet seat, providing an opening between the arms for access to the seat.

The arms 10 may be connected to a back 12 that extends upwardly from a rear portion of the toilet. One or more sensors 14 are used that sense movement by an occupant that is consistent with a person attempting to exit the toilet. Such movements typically involve moving from a seated position to a standing position. For example, a person's back moving away from the back 12 of the toilet is an indication that the person may be attempting to stand. Typically, this movement also includes a person applying pressure to one of, or both of, the arms 10 of the toilet, so as to push themselves from a seated position to a standing position.

Figure 2:
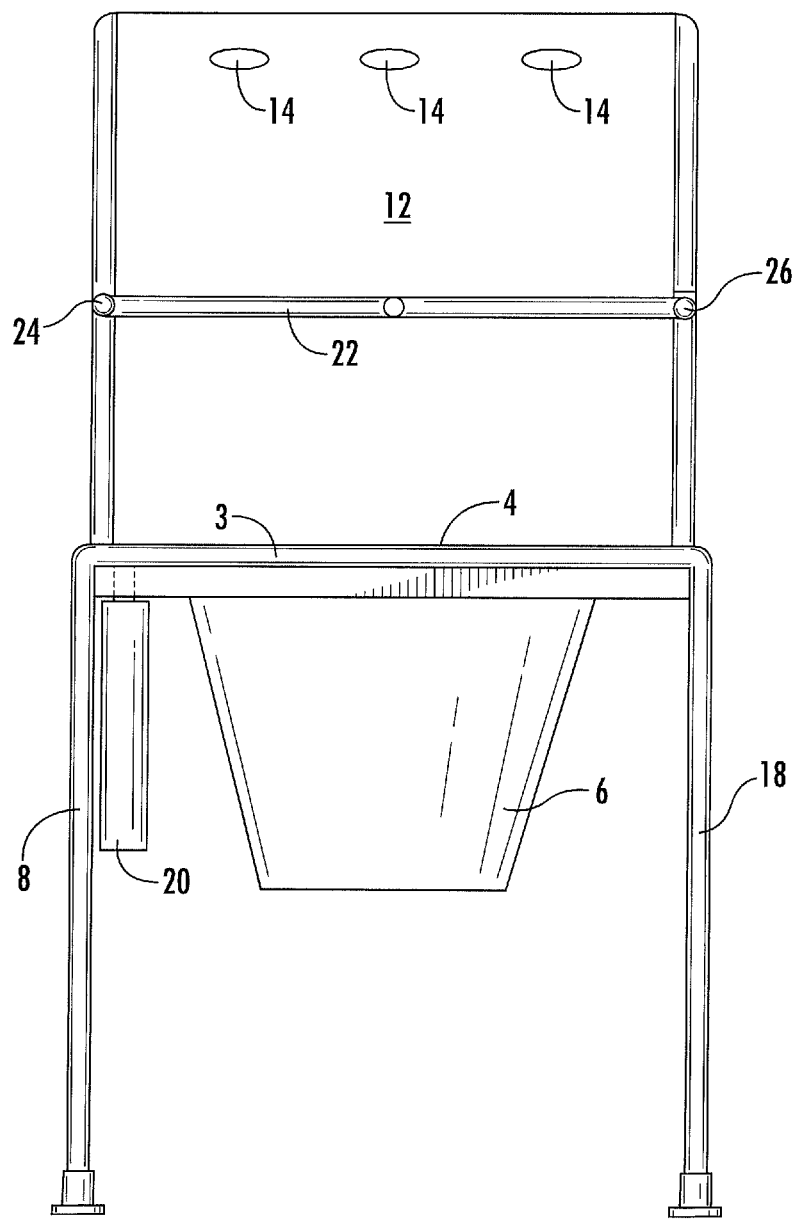
FIG. 2 is a front elevation of an embodiment of a toilet according to the invention.

Accordingly, in an embodiment, the toilet seat has sensors 14 in the back 12 of the seat that emit a radio frequency signal from a sending and receiving unit that measures movement away from the back and senses the distance of the user's back from the back 12 of the toilet. FIG. 2. Other sensor types that measure distance, such as distance measuring devices that use lasers, may be used as sensors 14. In one embodiment, when the user's back moves to a predetermined distance from a sensor or sensors 14, the back of the toilet seat is positioned lower than the front of the toilet seat to inhibit the person's attempt to exit or stand up. A signal may be emitted to an attendant as described herein anytime that the toilet seat moves due to actuation by a signal from a sensor.

In another embodiment, one or more of the sensors 14 sense motion. The motion sensors are calibrated to actuate the actuator due to more movement by the user that is more than normal shifting about while seated.

In an embodiment, one or more pressure sensors 18 are located in the arms of the device. A plurality of spaced apart pressure sensors may be used, since different users will apply pressure to the arms in different places while attempting to stand up or exit the toilet. The pressure sensors are calibrated so that when pressure that is significant enough to indicate a user's attempt to stand or exit the toilet, the toilet seat moves to an inclined position as described herein to inhibit such movement.

Another change in pressure on the toilet that is indicative of a person attempting to stand is applying a force in a direction that is toward the rear of the toilet. In another embodiment, one or more pressure sensors 28, which may be load cells, are located in the arms of the device sense rearward pressure on the arms 10, as demonstrated by the arrow on the arm in FIG. 1. The pressure sensors 28 measure such rearward pressure and actuate the lowering of the rear of the toilet seat in response to the pressure. The pressure sensors are calibrated so that when pressure that is significant enough to indicate a user's attempt to stand or exit the toilet, the toilet seat inclines to inhibit such movement. The pressure sensors 28 are preferred to be used with pressure sensors 18 but may be used independently of each other.

The dotted line and vertical arrow in FIG. 1 demonstrate exemplary movement of the toilet seat 3. A change of the angle of the toilet seat 3 from substantially horizontal to an incline, with the rear of the toilet seat lower than the front of the toilet seat, or a portion of the toilet seat that is closer to the front, may be accomplished by hinging a portion of the toilet seat so that it pivots. The actuators 20, 120 may be an air or hydraulic cylinder that may be used to pull the rear of the toilet seat down or push the front of the seat up in another embodiment, in response to movement of the user, and/or pressure applied to the arms of the toilet as described above. The actuators' normal position holds the seat and occupant in a generally horizontal position.

In another embodiment, the actuators 20, 120 may be electrically powered actuators. In one embodiment, an electric motor with rack and pinion gear may be used as an actuator to move the seat. The electric motor may be powered by a battery, particularly where portability of the toilet is desired. In one embodiment, two batteries 42, 44 provide power redundancy.

The actuators 20, 120 may be extended to support the toilet seat 3 in a generally horizontal position under normal use, but upon receiving a signal from a motion sensor, pressure sensor or other sensor, or a combination, the actuator retracts so as to pull the rear of the hinged toilet seat downwardly, or in another embodiment, push the front of the seat upwardly. The toilet seat is repositioned at an angle, which is preferred to not to exceed thirty degrees from horizontal and is more preferred to not exceed twenty-two and a half (22½°) degrees from horizontal. The incline of the toilet seat will inhibit, although not necessarily prevent, a user from standing or exiting the toilet.

In another embodiment, lowering of the rear of toilet seat 3 may be terminated if the sensor or sensors that have initiated actuation of the actuators 20, 120 senses that movement by the user is terminated. For example, if pressure on the arms is terminated, or movement away from the seat back is terminated and the user moves his or her back against the seat back, movement of the seat may be terminated at less than full movement.

In another embodiment, upon sensing that movement is terminated, the seat returns to its original position, or alternatively, only if the user's back is positioned against the seat back as sensed by sensors 14 does the seat return to its original position. In these embodiments, the device is preferred to again lower the rear of the seat if movement is sensed.

In a preferred embodiment, actuation of one or more of the sensors also actuates an alert provided to an attendant so that help is summoned to the toilet and to the user of the toilet. Such alert may be an audible or visual signal 40 provided at a central location, such as a nurse's station, or a signal that is provided to a mobile telephone or other receiving device. A call button 30 may be positioned on the device so that the user may intentionally press the button to seek assistance. Wireless communications may be used to alert an assistant.

Figure 6:
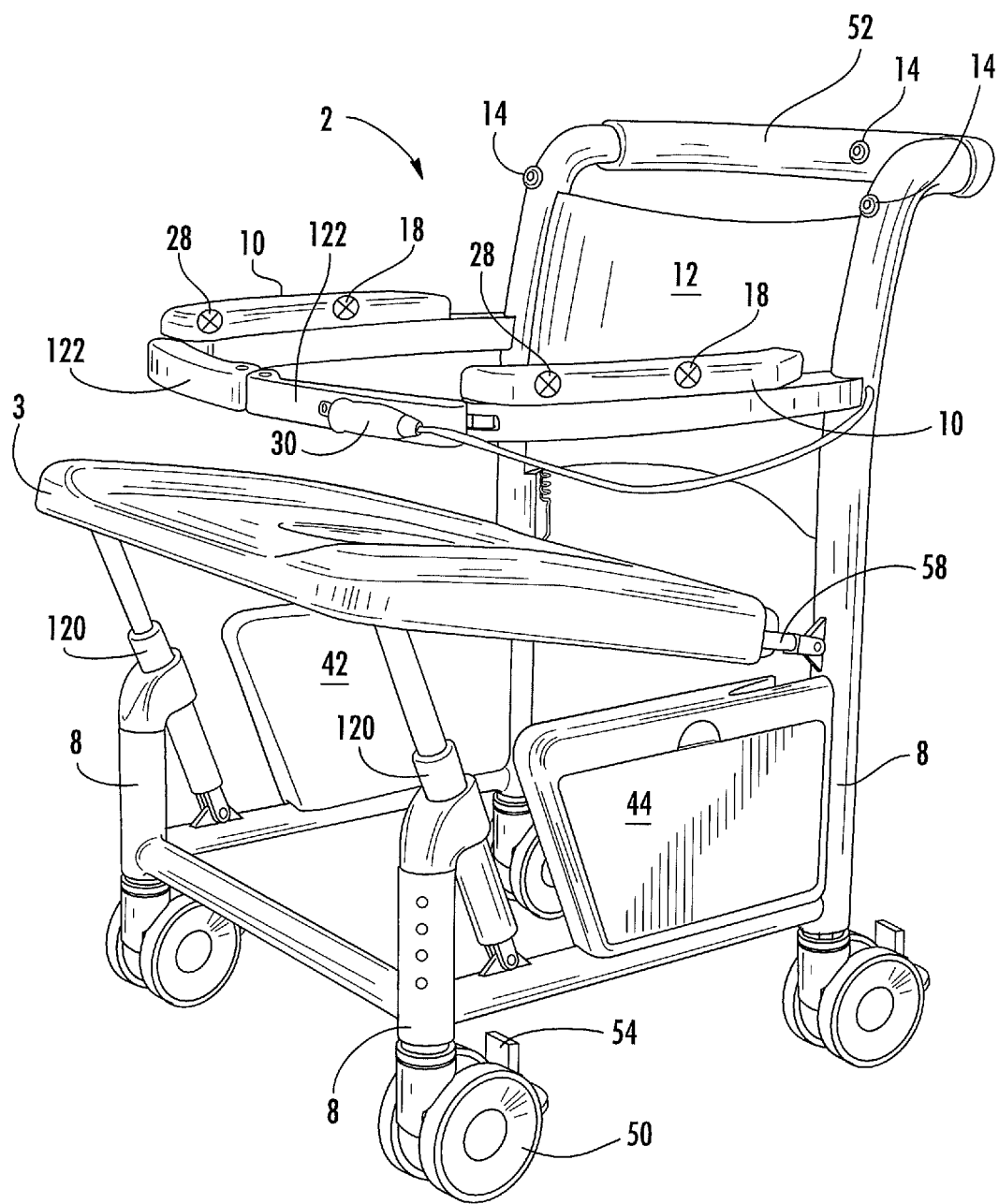
FIG. 6 shows a left side perspective view of the embodiment of the invention of FIG. 5.

In another embodiment, the actuator for the seat is actuated by a mechanical switch. For example, a barrier, such as crossbar 22, 122 is positioned between the arms at the front of the toilet. FIG. 2; FIG. 6. The barrier may be pivotally mounted 26 at one end of the barrier. In yet another embodiment, two barriers or crossbars 102 are used, with one barrier pivotally mounted to each of the arms. If the user attempts to exit the toilet by pushing the barrier away from the opening, a crossbar sensor senses movement of the barrier. The crossbar sensor 24 may be a switch that initiates actuation of the actuators 20, 120. Actuating the crossbar sensor by pushing against it could lock the crossbar from further movement, preventing the occupant from exiting the toilet. However, it is not deemed to be desirable to have a locking bar which would restrain or materially inhibit a person from exiting the toilet. A bar that locks or has significant resistance could result in the user feeling unduly restrained.

In another embodiment, the actuator may be mounted to push or lift the back of the seat above the front of the seat in order to assist exiting the toilet. In this embodiment, the maximum angle of the seat is limited to a maximum of about 30° from horizontal and is more preferably limited to about 22½°, from horizontal. Lifting the rear of the toilet seat 3 relative to the front is preferred to be actuated by a switch or other actuation device to which the user of the toilet does not have access while occupying the toilet. Actuation of this feature is preferred to be available only when an assistant is present. Actuation may be provided by a switch that communicates with the actuator or actuators 20, 120, such as a mechanical switch or a wireless remote communications device.

Figure 3:
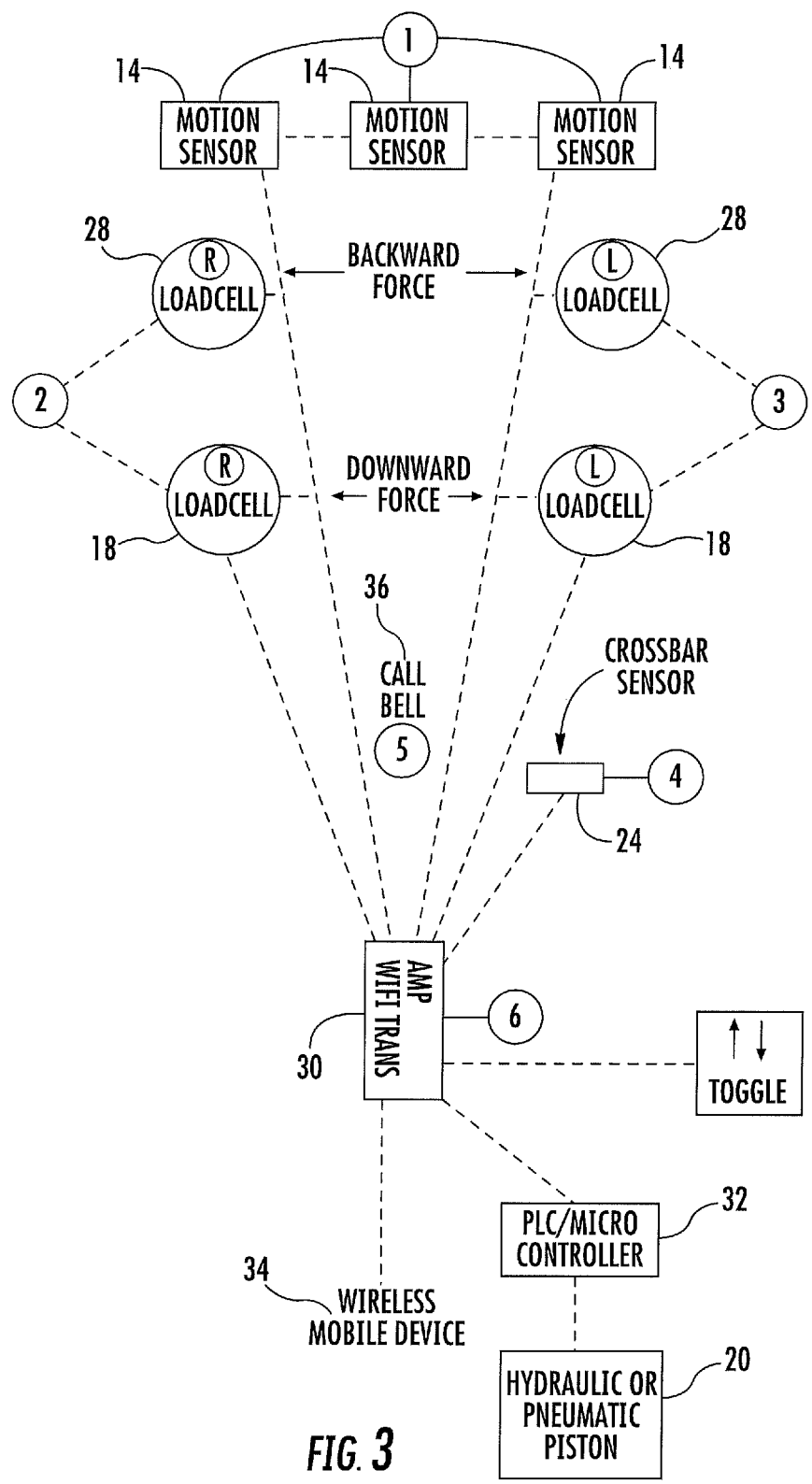
FIG. 3 is a schematic illustration of an interaction of various sensors according to an embodiment of the invention.
Figure 4:
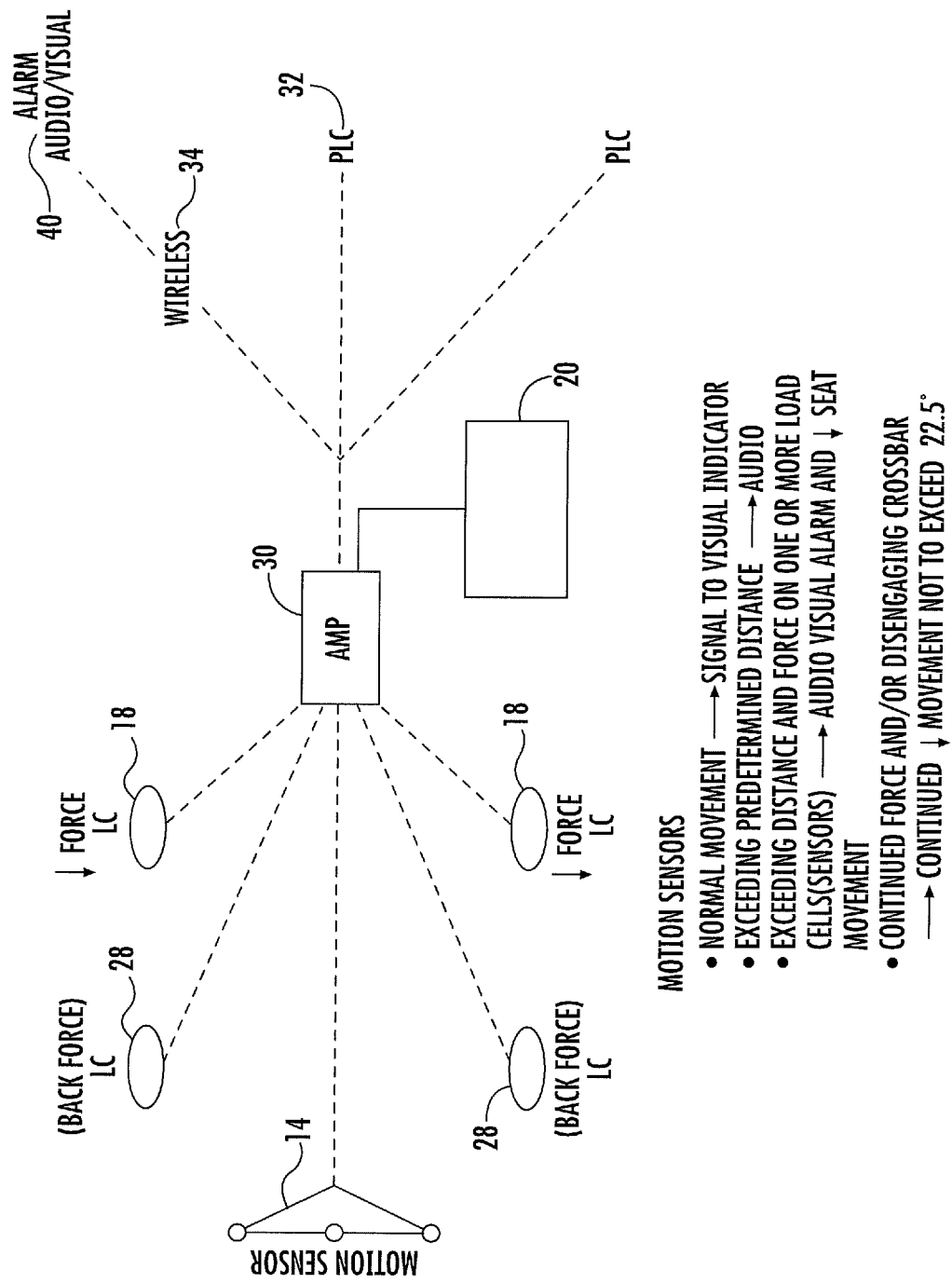
FIG. 4 is an additional schematic illustration of the interaction of various sensors according to an embodiment of the invention.

FIG. 3 and FIG. 4 demonstrate the interrelationship of the electromechanical features of the invention according to an embodiment of the invention. The motion or distance sensors 14, load cells 18, and crossbar sensor 24 communicate with a wireless transmitter that may include a signal amplifier. Communications may be via a local area wireless computer networking technology (Wi-Fi) connective devices, or devices that provide short range wireless communications, including but not limited to those communications devices operating at frequencies between 2402 and 2480 MHz, or 2400 and 2483.5 MHz, such as Bluetooth® devices. The wireless transmitter 30 may be connected to a microcomputer 32 that actuates the actuators 20, 120 121. The wireless transmitter may also actuate an audible or visual signal, which is demonstrated by the call bell 36 in FIG. 3. The wireless transmitter may also communicate conditions of the sensors and the toilet to a wireless mobile device 34 such as a smartphone.

As shown in an embodiment of FIG. 4, exceeding force levels or movement sensed by the sensors actuates signaling (audio and/or visual) and/or operation of the actuators or actuator 20, 120. The use of one or more programmable logic controllers (PLC) allows the force on the sensors such as the load cells to be programmed as required. Some users, due to size or physical condition, will require more or less sensitivity on the sensors, which may be varied by the use of the programmable logic controllers.

Load cells may be used as sensors for sensing pressure as stated herein. A load cell is a transducer that creates an electrical signal whose magnitude is positively related to the magnitude of force applied. Some load cells measure deformation due to load and produce the electrical signal, such as strain gauge and piezo-electric load cells. The load cells 18 produce an electrical signal that actuates the movement of the seat when the force exceeds a preset level. Normal arm pressure from the user's movement while sitting on the toilet does not result in actuation of the sensors or the actuator, but pushing down on the arms, or pushing the arms toward the rear, as the occupant attempts to exit the toilet increases the magnitude of the signal generated by the load cell to a threshold that causes movement of the toilet seat as described herein. The threshold may be variable as required for the application of the toilet. It is believed that a minimum pressure of 30 pounds per square inch as measured by the sensor will indicate that pressure is applied to an arm of the toilet is consistent with a person exiting the toilet.

In an embodiment, downward pressure on either or both of the arms at a force that is in excess of normal movement of the user's hands and arms, and consistent with pressure placed on the toilet's arms when pushing down on the arms when exiting the toilet, is sufficient to actuate movement of the toilet seat by the actuators. In another embodiment, rearward pressure on either or both of the arms at a force that is in excess of normal movement of the user's hands and arms, and consistent with rearward pressure placed on the toilet's arms when pushing away from the toilet when exiting, is sufficient to actuate movement of the toilet seat by the actuators.

In an embodiment, the device does not have a receptacle 6 as shown in FIGS. 1 and 2. Rather, the toilet is positioned over an existing permanent toilet. The opening 4 in the seat 3 communicates with the opening in the plumbed in toilet, and is positioned over the permanent, plumbed in toilet. With a receptacle 6 in place as shown in FIG. 1, the device may be used in close proximity to a bed, so that a limited mobility user need only travel a short distance to use the toilet.

The features discussed above with regard to an embodiment having actuators 20 positioned at or near the rear portion of the seat (FIG. 1, FIG. 2) may also be applied to an embodiment having a pair of actuators 120 positioned (FIG. 5 and FIG. 6) at the front of the seat.

Figure 5:
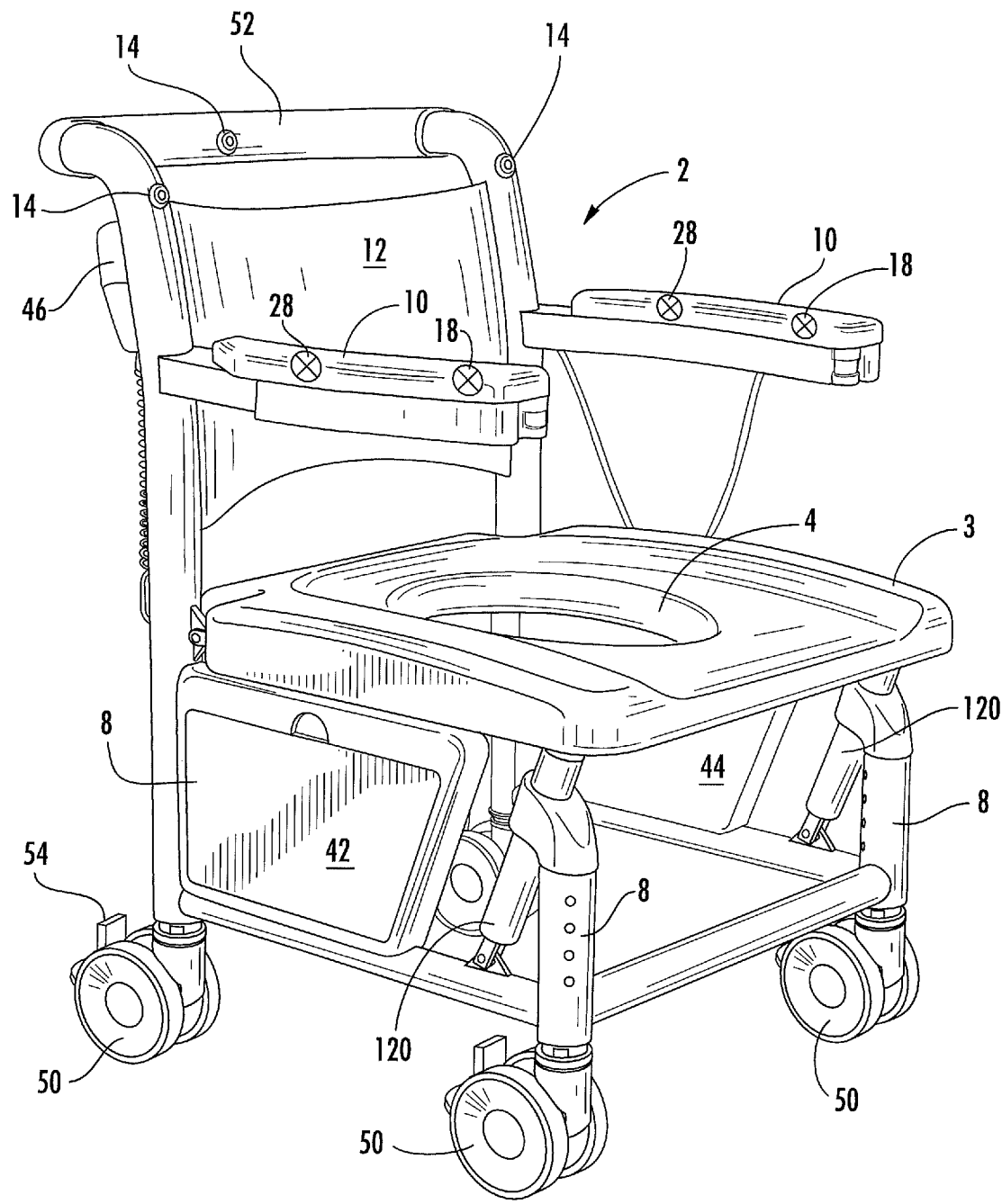
FIG. 5 shows a right-side perspective view of another embodiment of the invention.

The seat in the embodiment of FIG. 5 and FIG. 6 is shown as being pivotally mounted in the rear portion of the seat, which is referred to as being hinged. As shown in the drawings, a pin is positioned in a mounting arm 58 that is part of the rear portion of the seat that acts as a hinge and allows the rear of the seat to pivot relative to the frame of the toilet. The mounting arm 58 may slide or telescope relative to the seat to facilitate the movement of the seat as it moves from the position in FIG. 5 to the position in FIG. 6, and back.

The toilet is preferred to be portable and may be fitted with a caster 50 at each of the four (4) legs. The casters may be fitted with a locking device 54 to selectively retard movement of the toilet. A handle 52 may be provided for pushing or pulling the toilet.

Figure 8:
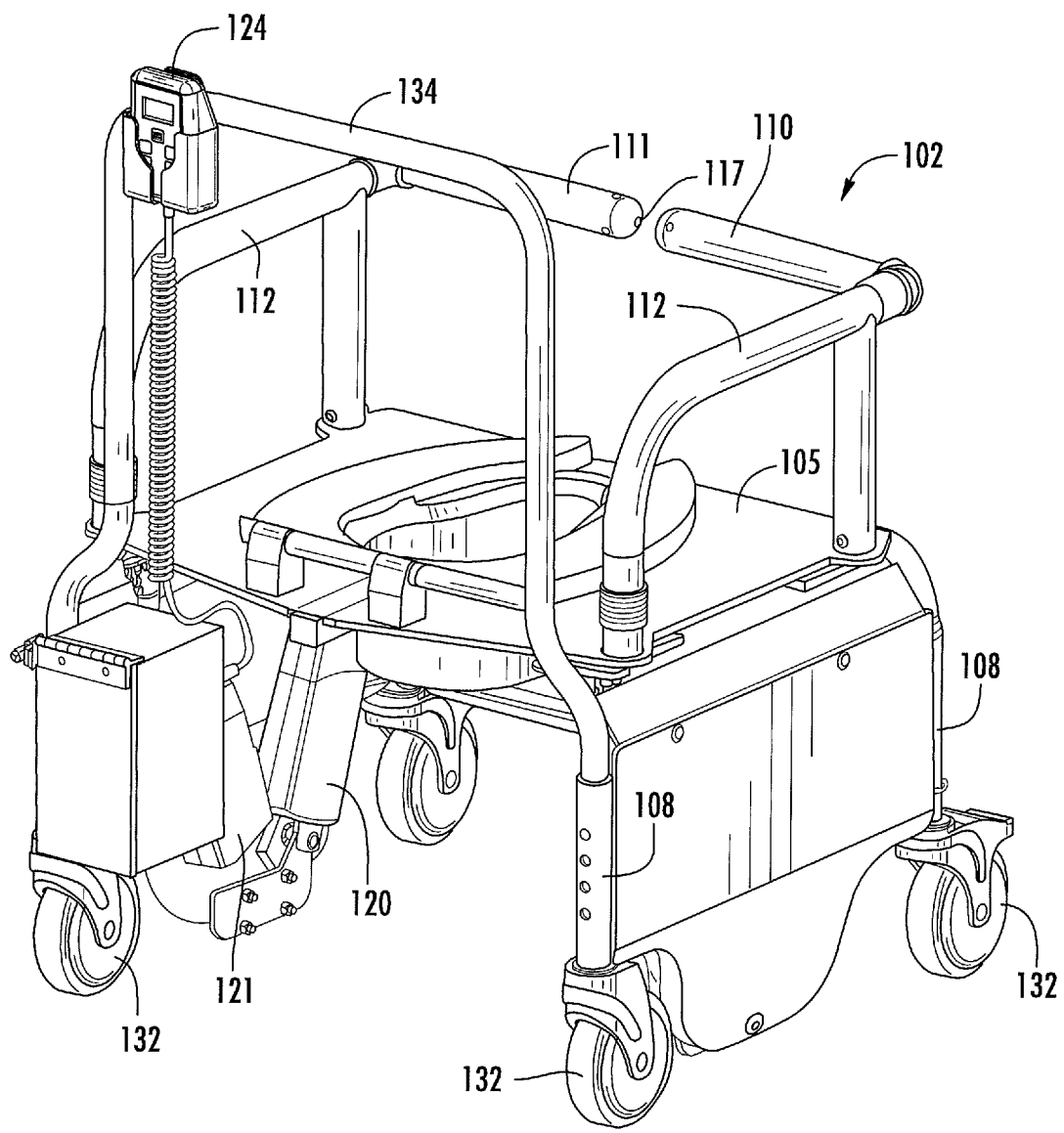
FIG. 8 is a rear perspective view of the embodiment of the toilet shown in FIG. 7.
Figure 9:
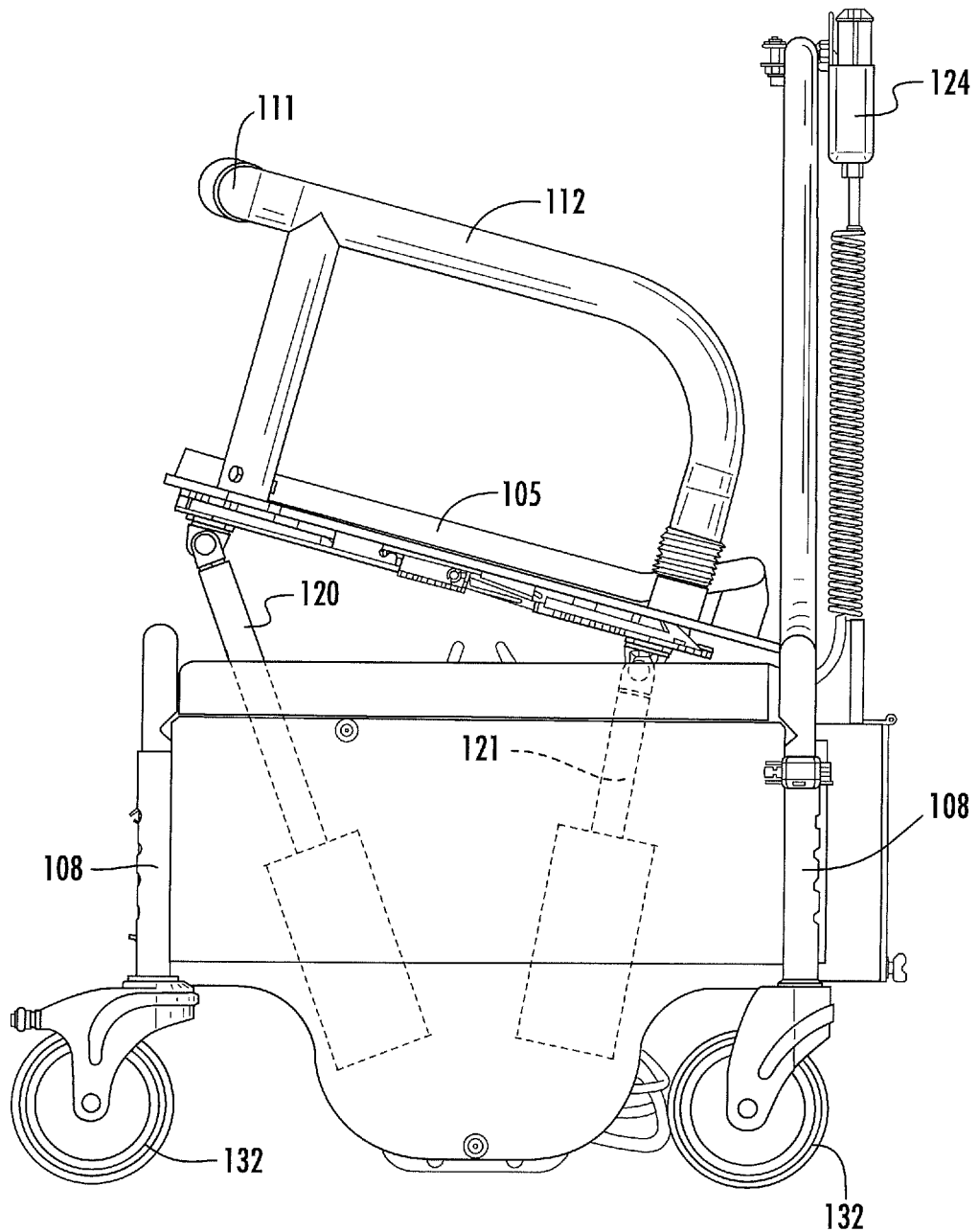
FIG. 9 is a side elevation of the embodiment of the toilet shown in FIG. 7.
Figure 12:
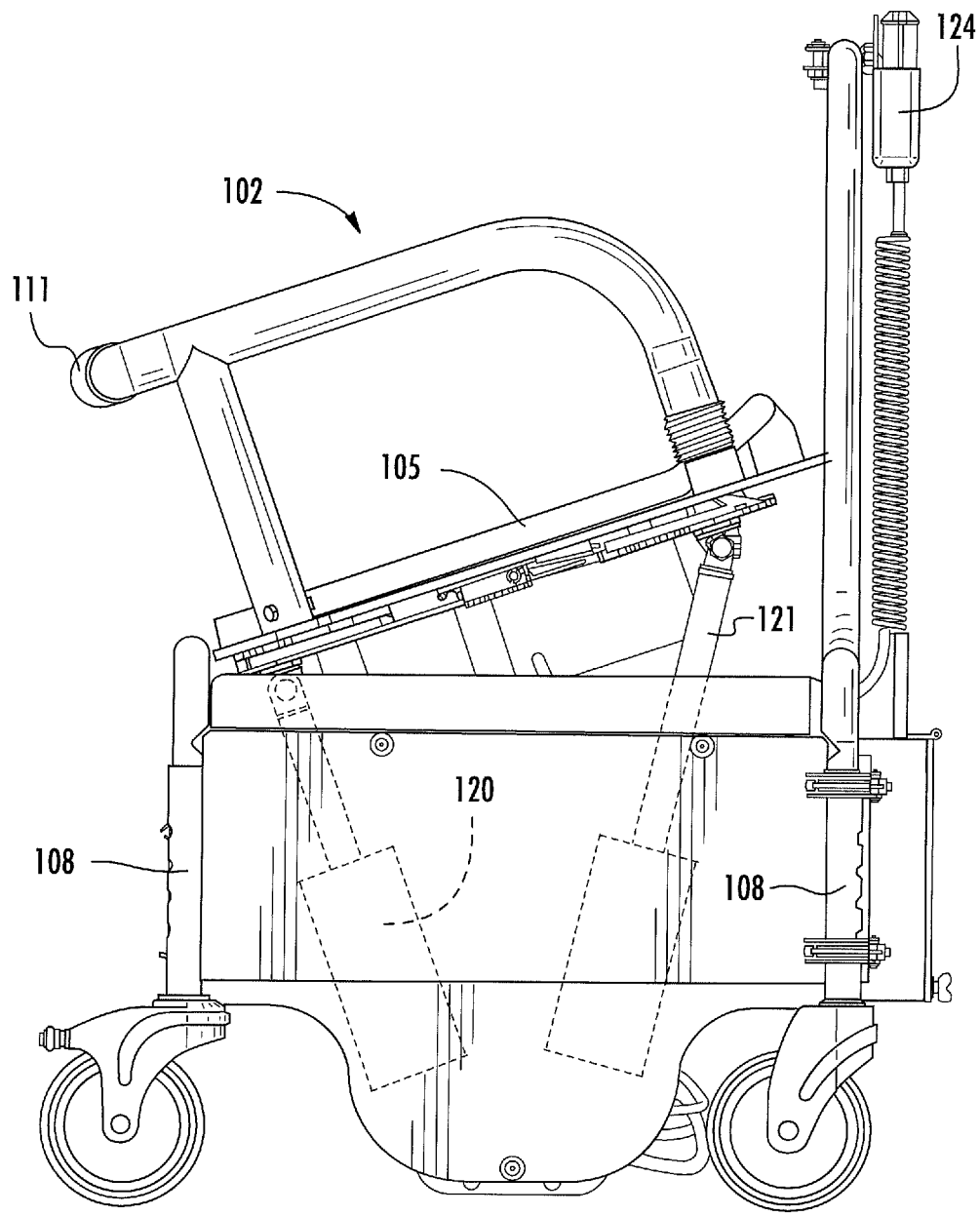
FIG. 12 is a side elevation of the embodiment of the toilet shown in FIG. 9, with the seat in another configuration.

In the embodiment shown in FIGS. 7-9, the actuator moves the front of the seat upwardly to inhibit exiting the toilet. The inclined position of the seat is accomplished by moving the front of the seat upwardly relative to the rear of the seat to inhibit exit from the toilet. The actuator or a separate actuator ("actuator") may also move the rear of the seat upwardly relative to the front of the seat to assist in exiting. FIG. 12. Movement of the rear of the seat upwardly relative to the front of the seat may be controlled solely by an operator such as a nurse who is not the user or occupant of the toilet.

The toilet 102 shown in FIGS. 7-9 has a seat construct 105 that is referred to as the "seat", with an opening 104 in the seat that communicates with a receptacle for waste material. The seat may be elevated to an appropriate height by a plurality of length adjustable legs 108, such as four legs as shown.

One or more arms may be provided that inhibit exit from the toilet. A pair of arms 110, 111 are shown as spaced apart and are present in front of the toilet seat. The arms may be hingably connected so as to pivot relative to a frame 112 to which they are connected. The arms open to permit occupant ingress to the toilet seat and are pivoted to a closed position while the toilet is occupied. The frame 112 may comprise a back 136 that extends upwardly from a rear portion of the toilet. The frame may be formed of tubing of sufficient strength to support the occupant and the functions of the toilet.

Figure 10:
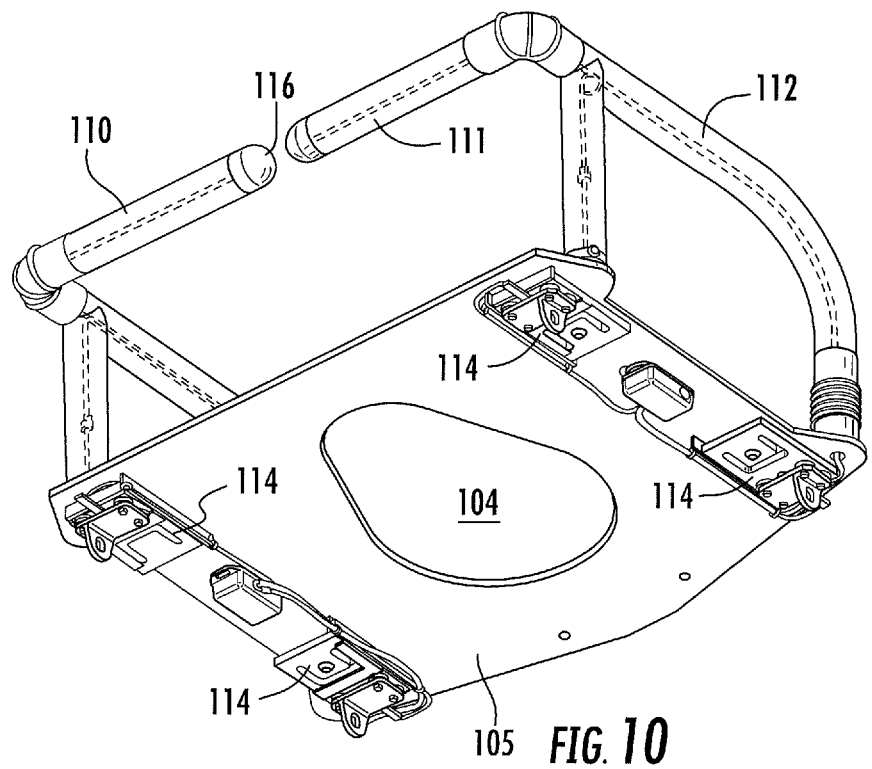
FIG. 10 is an isolation of an underside of an exemplary seat of the embodiment of the toilet shown in FIG. 7.

The seat 105 is preferred to comprise a plurality of load sensors. The load sensors may be positioned under the seat. As shown in FIG. 10, four spaced apart load sensors 114 are used, with one of the load sensors positioned near each of the four corners of the toilet seat. The load sensors measure a load placed on the toilet seat as the occupant first sits on the seat. Movement by an occupant that is consistent with a person attempting to exit the toilet changes the load measured by the sensors. Changes in load due to occupant movement can be determined by empirical study, and predetermined settings employed to cause a signal to be sent to an actuator to actuate movement of the toilet seat to retard exiting the toilet. Such movements typically involve moving from a seated position to a standing position. For example, a person moving weight away from the back of the toilet is an indication that the person may be attempting to stand. The load on the more rearward load sensors will be decreased, while the load on the front sensors may be increased. Load cells may be used as load sensors for sensing pressure. A signal may be emitted to warn an attendant and/or occupant as described herein anytime that the toilet seat moves to inhibit exiting in response to actuation by a signal from a sensor.

In a preferred embodiment, a signal emitter and a signal receiver are positioned at or near an opening in the frame. The signal emitter emits a signal that is received by the signal receiver. If the signal path is broken by a person crossing the path of the signal, another signal is transmitted to the actuator and/or to the alarm(s) indicating that the occupant is trying to exit the toilet without assistance. The signal may be an optical signal, such as a light beam from a photo (optical) emitter with the signal received by the photo (optical) receiver. The signal may be an infrared signal emitted by an infrared emitter that is received by an infrared receiver.

In a specific embodiment shown in FIGS. 7-9, a photo emitter 116 is positioned in arm 110, and a photo receiver 117 is positioned in arm 111. The photo emitter emits a light signal that is received by the photo receiver. If the light signal path is broken by pushing the hingably connected arms outwardly, a signal is transmitted to the actuator and/or to the alarm(s) indicating that the occupant is trying to exit the toilet without assistance. It is preferred that the hinged arms are mounted so as to resist movement from, for example, the occupant resting his or her arms on the hinged arms. While the arms could be locked to prevent movement, in most applications it is not desirable for the occupant to feel trapped in the toilet. Therefore, while the arms resist movement, the occupant should be able to move the arms aside, with the movement of the toilet seat then initiated to retard exiting without assistance. An infrared emitter and infrared receiver could be similarly employed.

FIG. 9 demonstrates an example of movement of the toilet seat 105. A change of the angle of the toilet seat from substantially horizontal to an inclined position, with the rear portion of the toilet seat lower than a front portion of the toilet seat. This position may be accomplished by hinging a portion of the toilet seat so that it pivots. The actuators 120, 121 may be air or hydraulic cylinders that pull the rear of the toilet seat down or in another embodiment, push the front of the seat up, in response to movement of the user, and/or movement or pressure applied to the arms of the toilet as described above. The actuator's normal position holds the seat and occupant in a generally horizontal position.

In another embodiment, the actuators 120, 121 may be an electrically powered actuator. The actuators may be electric linear actuators having sufficient load capacity to lift the toilet seat while occupied as described herein. Electric actuators may be battery powered, particularly where portability of the toilet is desired. Each pair of actuators is preferred to have a combined lifting force substantially in excess of normal requirements, and for example, should have a 2:1 safety factor. In one embodiment, two batteries provide power redundancy. The batteries may be rechargeable.

The actuators 120, 121 may be positioned to support the toilet seat 105 in a generally horizontal position under normal use, but upon receiving a signal from a motion sensor, pressure sensor or other sensor, or a combination, the actuator may retract so as to pull the rear of the hinged toilet seat downwardly, or in another embodiment, extend to push the front of the seat upwardly. The toilet seat is repositioned at an angle, which is preferred to not exceed thirty degrees from horizontal and is more preferred to not exceed twenty-two and a half (22½°) degrees from horizontal, or fifteen (15°) in another embodiment. The incline of the toilet seat will inhibit, although not necessarily prevent, a user from standing or exiting the toilet.

In another embodiment, movement of the seat in stages occurs. The seat moves to the position shown in FIG. 9 in stages based upon the movement of the occupant. If the load on the load sensors in the seat senses a change in load consistent with an occupant attempting to exit the toilet, the front of the seat 105 is inclined by the actuators relative to the rear of the seat, for example, 4°-6° from horizontal. If the occupant resumes a position transmitting a load to the load sensors that is consistent with the occupant remaining in the toilet, the seat moves no more, and may after a predetermined time return to its normal generally horizontal position. If the load on the load sensors in the seat continues to sense a change in load consistent with the occupant attempting to exit the toilet, the front of the seat 105 is inclined to a second position, for example, 8°-12° from horizontal. This process may be repeated or continued, with the seat inclining to its maximum incline, until help arrives to assist the occupant.

A step-wise or iterative incline of the seat may be initiated in a similar manner by the arms 110, 111 having a photo emitter 116 and receiver 117. In this embodiment, the arms may be spring biased to return to the position wherein the light signal is received by the receiver. If receipt of the light signal is interrupted the front of the seat 105 is inclined relative to the rear of the seat, for example, 4°-6° from horizontal. If the occupant removes pressure from the arms so that spring biasing of the arms returns to a normal position and the light signal reception is restored, the seat moves no more, and may after a predetermined time return to its normal generally horizontal position. If the reception of the light signal continues to be interrupted, the front of the seat 105 is further inclined, for example, to 8°-12° from horizontal. This process may be repeated or continued, until help arrives to assist the occupant In a preferred embodiment, actuation of one or more of the load sensors 114 and/or movement of the arms 110,111 also actuates an alert that is provided to an attendant so that help is summoned to the toilet and to the user of the toilet. Such alert may be an audible and/or visual signal provided at a central location, such as a nurse's station, or a signal that is provided to a mobile telephone or other receiving device. A call button may be positioned on the device so that the user may intentionally press the button to seek assistance. Wireless communications may be used to alert an assistant.

In another embodiment, a pair of actuators 121 may be mounted to push or lift the back of the seat above the front of the seat in order to assist exiting the toilet. FIG. 12. In one embodiment, the maximum angle of the seat is limited to a maximum of about 30° from horizontal and is more preferably limited to about 22½°, from horizontal. Lifting the rear of the toilet seat 105 relative to the front is preferred to be actuated by a switch or other actuation device to which the user of the toilet does not have access while occupying the toilet. The controller 124, which is accessible to the attendant, may be used to actuate movement of the rear of the seat to a position that is above the front of the seat. Actuation may be provided by a switch that initiates communication of a signal to cause actuators 121, which are lift actuators in FIG. 15, to lift the seat to encourage exiting from the toilet when the attendant is present to assist the occupant.

In one embodiment, a pair of actuators (left and right) lift the front of the seat relative to the rear of the seat to discourage exiting the seat as described herein. Two additional actuators (left and right) lift the rear of the seat to assist with exiting the seat as described herein.

A controller 124 provides the attendant with the ability to control the descried features of the device. The controller may be hard wired for control and termination of the alarms and warning signals as well as for movement of the seat 105. Communications between the controller and the toilet may be via a local area wireless computer networking technology (Wi-Fi) connective devices, or devices that provide short range wireless communications, including but not limited to those communications devices operating at frequencies between 2402 and 2480 MHz, or 2400 and 2483.5 MHz, such as Bluetooth® devices. The controller may be connected to a microcomputer that controls operation of the actuators 120, 121. The controller may be a pendant that allows an operator to position or reposition the toilet seat by means of the actuators. The controller may also clear the call feature, show the indicated battery charge level, or provide other monitoring and control functions. The controller is preferred to be positioned on the back of the toilet where it is not easily accessible to a person seated in the toilet A wireless transmitter built into the device may also actuate an audible or visual signal that is located remotely, such as a nurses' station. A call bell switch may be provided. The wireless transmitter may also communicate conditions of the sensors and other operating conditions of the toilet to a wireless mobile device such as a smartphone. A visual and/or audible signal may be emitted from the toilet construct. An audible signal may emanate from a speaker 118 initiated by the main control board upon receiving a signal indicating an attempted exit from the toilet. The toilet may include an audio system that emits spoken messages or warnings that are provided, for example, from way files and emitted from the speaker. The message content of the way files or similar audio files may be changed from time to time. The way files or other audio files may also include warning sounds, such as bells or sirens.

Exceeding force levels sensed by the sensors 114 indicating movement consistent with an attempted exit from the toilet actuates signaling (audio and/or visual) and/or operation of the actuators 120, which are inhibit actuators (FIG. 15). The use of one or more programmable logic controllers (PLC) allows the force on the sensors such as the load cells to be programmed as required. Some users, due to size or physical condition, will require more or less sensitivity on the sensors, which may be varied by the use of the programmable logic controllers.

Figure 11:
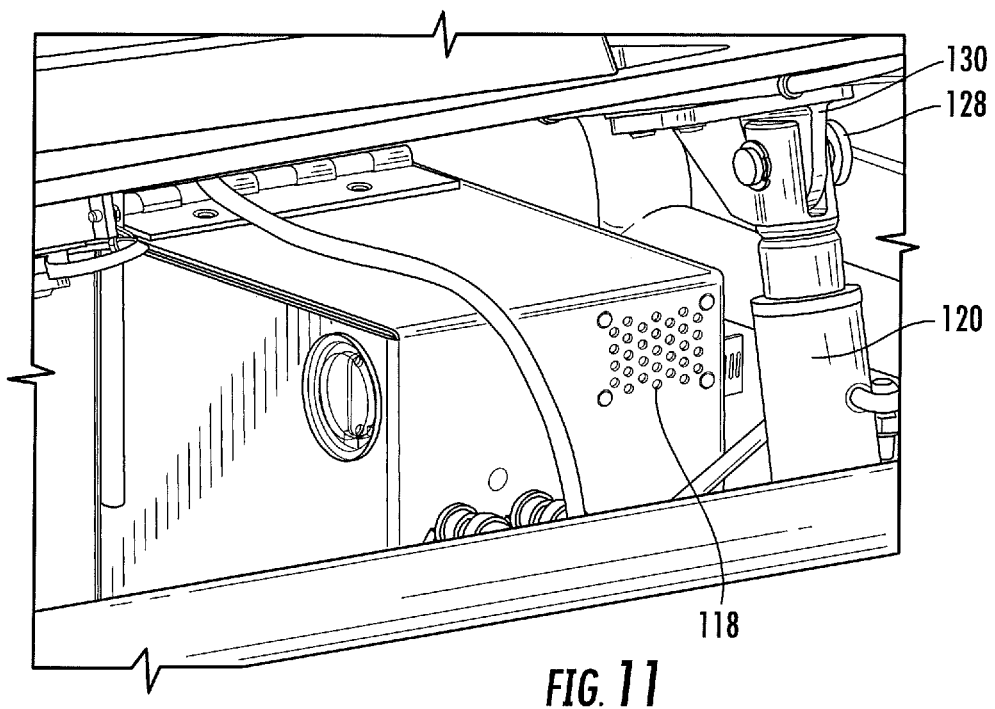
FIG. 11 is an isolation of a housing for electronic components of the embodiment of the toilet shown in FIG. 7.

The seat may be pivotally mounted, which is also referred to as being hinged or hingably mounted. As shown in FIG. 11, a pin 128 may be positioned in a mounting arm 130 that is part of the seat, acting as a hinge and allows the seat to pivot relative to the frame of the toilet.

The toilet is preferred to be portable and may be fitted with a caster 132 at each of the four (4) legs. The casters may be fitted with a locking device to selectively retard movement of the toilet. A handle 134 may be provided for pushing or pulling the toilet. The handle may also serve as a back in an embodiment.

The actuators 120,121 controller 124, sensors 114 and photo (optical) emitter/receiver 116, 117 may communicate through a main control board. FIG. 15.

What is claimed:

1. A toilet, the toilet comprising:
    a seat having an opening therein;
    a seat back connected to the seat;
    a plurality of load sensors in communication with the seat; and
    an actuator;
    wherein, in use, a load sensor of the plurality of load sensors, upon sensing a predetermined change in a load on the seat after a user is seated, transmits a signal to the actuator, whereupon the actuator moves the seat to incline upwardly from a rear of the seat to a front portion of the seat.

2. A toilet as described in claim 1, wherein in use, after the actuator moves the seat to a first position to incline upwardly from a rear of the seat to a front portion of the seat, a load sensor of the plurality of load sensors senses a predetermined change in a load on the seat, the load sensor transmits a signal to the actuator, whereupon the actuator moves the seat to a second position to incline upwardly from a rear of the seat to a front portion of the seat, wherein the upward incline of the second position is greater than the upward incline of the first position.

3. A toilet as described in claim 1, further comprising:
    a frame, the frame being connected to the seat and the frame having an opening therein;
    a signal emitter and a signal receiver each spaced apart and positioned at or near the opening of the frame, wherein the signal receiver receives a signal from the signal emitter;
    wherein, in use, upon the signal receiver failing to receive a signal from the signal emitter, an additional signal is transmitted to the actuator, whereupon the actuator moves the seat to incline the seat upwardly from the rear portion of the seat to the front portion of the seat.

4. A toilet as described in claim 3, wherein the signal emitter is a photo emitter and the signal receiver is a photo receiver and the signal is a light signal.

5. A toilet as described in claim 3, wherein the signal emitter is an infrared emitter and the signal receiver is an infrared receiver and the signal is an infrared signal.

6. A toilet as described in claim 1, further comprising:
    a first arm positioned forward of the opening of the seat; and
    a second arm positioned forward of the opening of the seat and spaced apart from the first arm, wherein the first arm comprises a photo emitter and the second arm comprises a photo receiver that receives a light signal from the photo emitter;
    wherein, in use, upon the photo receiver failing to receive a light signal from the photo emitter, a signal is transmitted to the actuator, whereupon the actuator moves the seat to incline the seat upwardly from the rear portion of the seat to the front portion of the seat.

7. A toilet as described in claim 6, wherein the first arm is mounted to a frame, and the first arm is hingably connected to the frame.

8. A toilet as described in claim 6, wherein the first arm is mounted to a frame, and a second arm is mounted to a frame, and at least one of the first arm and the second arm is hingably connected to the frame.

9. A toilet as described in claim 1, further comprising:
    a first arm positioned forward of the opening of the seat; and
    a second arm positioned forward of the opening of the seat and spaced apart from the first arm, wherein the first arm comprises a photo emitter and the second arm comprises a photo receiver that receives a light signal from the photo emitter;
    wherein, in use, upon the photo emitter failing to receive a light signal from the photo emitter, a signal is transmitted, and the signal actuates an audible warning or a visual warning to a location that is remote from the toilet.

10. A toilet as described in claim 9, wherein, in use, upon the photo emitter failing to receive a light signal from the photo emitter, a signal is transmitted, and the signal actuates an audible warning or a visual warning to a location that is remote from the toilet, wherein the intensity of the audible warning or the visual warning increases over time until terminated.

11. A toilet as described in claim 1, further comprising:
a first arm positioned forward of the opening of the seat; and
a second arm positioned forward of the opening of the seat and spaced apart from the first arm, wherein the first arm comprises an infrared emitter and the second arm comprises an infrared receiver that receives an infrared signal from the infrared emitter;
wherein, in use, upon the infrared receiver failing to receive a light signal from the infrared emitter, a signal is transmitted to the actuator, whereupon the actuator moves the seat to incline the seat upwardly from the rear portion of the seat to the front portion of the seat.

12. A toilet as described in claim 1, further comprising:
a first arm positioned forward of the opening of the seat; and
a second arm positioned forward of the opening of the seat and spaced apart from the first arm, wherein the first arm comprises an infrared emitter and the second arm comprises an infrared receiver that receives a light signal from the infrared emitter;
wherein, in use, upon the infrared emitter failing to receive a light signal from the infrared emitter, a signal is transmitted, and the signal actuates an audible warning or a visual warning to a location that is remote from the toilet.

13. A toilet as described in claim 1, wherein the plurality of loan sensors measure and read a load on the seat after an occupant is seated and upon a predetermined change in the load measured, a signal is transmitted to the actuator, whereupon the actuator moves the seat to a second position to incline upwardly from a rear of the seat to a front portion of the seat, wherein the upward incline of the second position is greater than the upward incline of the first position.

14. A toilet as described in claim 1, further comprising a remote controller that communicates with the toilet, wherein the remote controller transmits a signal to the actuator, and upon the controller receiving the signal from the actuator, the actuator moves the seat to incline the seat upwardly from the front portion of the seat to the rear portion of the seat.

15. A toilet as described in claim 1, wherein the seat is hinged in a rear portion of the seat.

16. A toilet as described in claim 1, wherein the actuator is an electrically powered linear actuator.

17. A toilet as described in claim 1, wherein the actuator is a first actuator positioned near a first side of the seat near a front of the seat and a second actuator positioned near a second side of the seat near the front of the seat.

18. A toilet as described in claim 1, wherein the actuator is a first actuator positioned near a front of the seat and a second actuator positioned near a rear of the seat.

* * * * *